and Lieberman

United States Patent [19]

Sanguu

[11] 4,218,639
[45] Aug. 19, 1980

[54] TAPE TENSION CONTROL FOR TAPE RECORDING AND/OR REPRODUCING SYSTEM

[75] Inventor: Isao Sanguu, Tokyo, Japan

[73] Assignee: Nippon Electric Company, Ltd., Tokyo, Japan

[21] Appl. No.: 856,045

[22] Filed: Nov. 30, 1977

[30] Foreign Application Priority Data

Nov. 30, 1976 [JP] Japan .................................. 51/144206

[51] Int. Cl.$^2$ ............................................. H02D 5/32
[52] U.S. Cl. ........................................ 318/6; 318/338; 318/493
[58] Field of Search ....................... 318/6, 7, 493, 338, 318/405, 406, 432; 360/70

[56] References Cited

U.S. PATENT DOCUMENTS

| | | | |
|---|---|---|---|
| 2,719,419 | 10/1955 | Fleckenstein | 318/6 |
| 2,964,691 | 12/1960 | Dinger | 318/338 |
| 3,221,237 | 11/1965 | Kalenian | 318/6 X |
| 3,345,457 | 10/1967 | MacLeod | 360/70 |
| 3,419,777 | 12/1968 | Asseo | 318/338 |
| 3,466,522 | 9/1969 | Cushing, Jr. | 318/338 X |
| 3,800,196 | 3/1974 | Zimmermann | 318/6 |
| 3,876,168 | 4/1975 | Powers, Jr. | 318/6 X |
| 4,037,144 | 7/1977 | Ohmae et al. | 318/493 X |
| 4,079,301 | 3/1978 | Johnson | 318/338 |

Primary Examiner—B. Dobeck
Attorney, Agent, or Firm—Hopgood, Calimafde, Kalil, Blaustein & Lieberman

[57] ABSTRACT

A purely electrical tension control system utilizing the characteristics of a shunt motor coupled with the supply reel. In a recording or reproducing mode, the reel drive motor is forced to rotate in a direction opposite to its normal direction of rotation, thus producing a counter electromotive force and torque for rotation. The counter electromotive force is detected and employed to control the motor torque to thereby maintain a fixed tape tension.

2 Claims, 3 Drawing Figures

TAPE TENSION CONTROL FOR TAPE RECORDING AND/OR REPRODUCING SYSTEM

FIELD OF THE INVENTION

This invention relates generally to tape recording and/or reproducing systems in which a tape form of recording medium, such as a magnetic tape, is transported at a fixed speed from a supply reel to a take-up reel over a transducer such as a magnetic head, and more particularly to tension control systems employed in such a tape recording and/or reproducing system to maintain the tape tension at a constant level during normal tape transport.

DESCRIPTION OF THE PRIOR ART

Conventional forms of tension control system are classifiable into three types. In the first type, as disclosed in U.S. Pat. No. 3,345,457, entitled "TENSION CONTROL FOR WIDEBAND RECORDING SYSTEM", a tension arm is provided, in the path of tape travel, between the supply reel and the capstan mechanism and a brake band is wound around the periphery of a drum secured to the shaft of the supply reel motor. In order to maintain the tape tension at a fixed level, the braking pressure of the brake band is adjusted in accordance with the position of the tension arm, which is variable with the tape tension. This type of tape tension control not only includes complicated mechanical structure but also has technical disadvantages in that the contact pressure between the brake band and the drum on the motor shaft can not be held uniform and thus the stability of tape travel is adversely affected.

In the second type of tension control, which is primarily used in magnetic tape systems for computer use, a vacuum column is provided along the path of tape travel between the supply reel and the capstan mechanism. The tape leaving the supply reel enters the vacuum column and, after proceeding in a loop therein, is directed to the capstan mechanism. The vacuum pressure in the vacuum column is held fixed in order to maintain the tape tension at a constant level. This type of tension control is highly efficient but is large in size and complicated in structure, due to the fact that mechanisms for vacuum supply and control of the vacuum are required.

In the third type of tension control, as disclosed in U.S. Pat. No. 3,800,196, entitled "ELECTRONIC CONSTANT-TENSION TAPE-HANDLING SYSTEM", the speed of rotation of the supply reel is detected, and the signal indicative of detected speed, is employed to control the output torque of the supply reel motor so as to maintain the tape tension at the constant level. This type of tension control, not only necessitates mechanical detecting means, such as a tachogenerator for detection of the rotational speed of the supply reel, but involves a problem in relation to the stability and accuracy of the system as the supply reel, with a full volume of tape wound thereon, is turned in the reverse direction at an extremely low speed for tape transport.

It is therefore an object of this invention to provide a novel tape tension control system which is capable of maintaining the tape tension at a constant level without fluctuation.

It is another object of the present invention to provode a tape tension control system of the character described above which is highly accurate, and does not include characteristically unstable mechanical apparatus.

SUMMARY OF THE INVENTION

According to the present invention, there is provided a tape tension control system for a tape recording and/or reproducing system which comprises a supply reel, a shunt motor coupled with the supply reel, a take-up reel arranged to wind up the tape as passed thereto from the supply reel, a transducer provided on the path of tape travel between the supply and take-up reels, a constant-current power supply source arranged to direct a predetermined current through the armature winding of the shunt motor, detector means for detecting the electromotive force induced in the armature circuit of the shunt motor, and means for controlling the field current of the shunt motor in accordance with the electromotive force detected.

It is a feature of the invention that, in the tape tension control system of the present invention, the counter electromotive force induced in the armature circuit of the supply reel motor, (shunt motor) during the normal tape transport is detected and the field current of the shunt motor is controlled in accordance with the electromotive force detected. More particularly, the torque on the supply reel motor is controlled by the counter electromotive force induced therein, which corresponds to the speed of rotation of the supply reel, to thereby control the tape tension. In this matter, the tape tension is entirely electrically controlled, and thus highly stable and accurate tension control is ensured.

The above and other objects, features, and advantages of the present invention will become more apparent from the following description taken in conjunction with the accompanying drawings.

DESCRIPTION OF THE PREFERRED EMBODIMENTS

Figure 1:
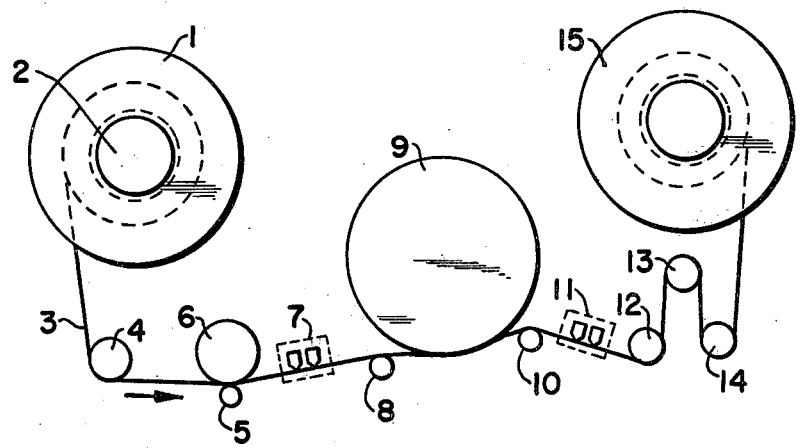
FIG. 1 is a plan view of a magnetic video recording and reproducing system, to which the tape tension control system of the present invention is applicable.
Figure 2:
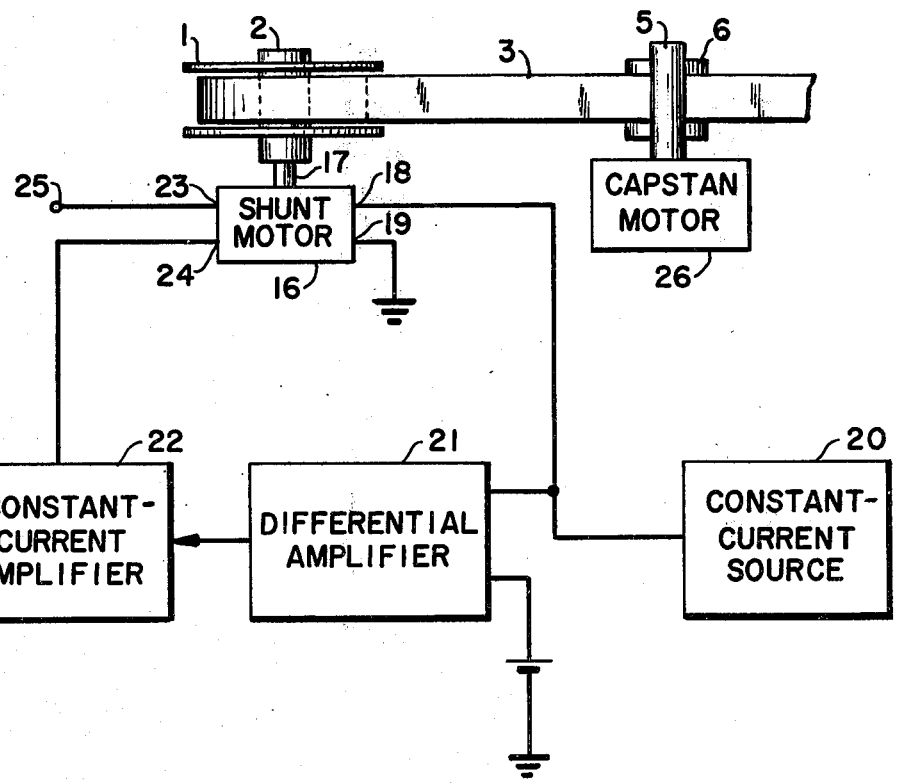
FIG. 2 is a block diagram of a preferred embodiment of the invention.

Referring first to FIG. 1, which schematically illustrates the general arrangement of a typical video recording and reproducing system, reference numeral 1 indicates a supply reel with a mass of magnetic tape 3 wound thereon and fixedly mounted on a rotating shaft 2 for rotation therewith. The magnetic tape 3 is transported from the supply reel 1 to take-up reel 15 at a fixed speed under the control of a capstan mechanism including a capstan roller 5 and a pressure roller 6. Reference numeral 4 indicates a guide roller, about which the magnetic tape 3, turns to proceed toward the capstan in the direction indicated by the arrow. The capstan roller 5 is driven by a capstan motor 26 (FIG. 2). Passing through the capstan mechanism, the magnetic tape 3 comes into contact with a first set of audio heads 7 and is further directed over a guide post 8 to a drum mechanism 9. The magnetic tape 3 proceeds helically around the periphery of the drum 9 substantially through an angle of 360°, and passes successively over a guide post 10, a second audio head 11, a guide roller 12, a tension arm 13 and another guide roller 14, and thence is wound on the take-up reel 15. The drum mechanism 9 is of a conventional structure, including a rotary disc and a video head arranged on the outer periphery thereof. The video head rotates and contacts the magnetic tape 3, substantially through an angle of 360°, to record or reproduce video signals.

In order that the magnetic tape 3 may be stably driven at a fixed speed in the direction of the arrow, by the capstan mechanism, it is required that the magnetic tape 3, which extends between the supply reel 1 and the capstan roller 5, be held under a holdback tension of an appropriate value. This tension must be held constant at all times.

In this connection, the amount of tape wound on the supply reel 1 varies as the tape is transported therefrom. Let a and b represent the minimum and maximum values respectively, that correspond to the distance J between the outermost turn of tape 3 and the axis of rotation of supply reel 1. More particularly, a corresponds to the state of the supply reel 1 when the supply reel is nearly empty and b corresponds to the state of the reel when it has a maximum amount of tape wound thereon.

Assume that supply reel 1 is subjected to a fixed holdback torque tending to turn the supply reel in a direction opposite to the normal direction for tape transport (recording or reproducing mode). The holdback tension, holding the tape, has a maximum value when the radius J of the outermost turn of tape on the supply reel is reduced to its minimum a and has a minimum value when the radius J is its maximum b. Thus, the holdback tension varies within definite limits having a ratio of b:a. This means that the tape cannot be held under fixed holdback tension resulting from a fixed value of holdback torque being exerted upon the supply reel 1, but the holdback torque should be varied in accordance with the quantity of magnetic tape remaining on the supply reel 1. It should also be noted that supply reel 1 rotates at an angular speed equal to that of the reel motor 16 (FIG. 2) and, in order for the magnetic tape 3 to be transferred at a constant speed, the speed of rotation of reel motor 16 should be determined at all times in accordance with the tape radius J. Also, there is a relationship between the holdback torque T and the tape radius J which is expressed by $F = T/J$, where F represents the holdback tension in the tape 3. It is noted, therefore, that the holdback tension F can be held at a constant value by varying the holdback torque T proportionally with the tape radius J. This means that the holdback tension F can be held constant by varying the holdback torque inversely with the speed of rotation, N, of the reel motor 16, which is inversely proportional to the tape radius J.

Generally, the torque induced in an electric motor is directly proportional to the magnitude of the armature current and that of the field current and varies with the speed of rotation. As far as the reel motor is concerned, however, the torque variation due to the variation in speed of rotation of the motor is negligible since the supply reel 1 is rotated at an extremely low speed of one revolution per second or less.

Based upon these considerations, the present invention proposes to detect the induced voltage developed across the armature winding of the supply reel motor, which is slowly rotated in a reverse direction during the recording or reproducing mode of the system, while maintaining the armature current of the motor at a fixed value. The induced voltage is proportional to the speed of rotation of the reel shaft 2, which varies with the volume of tape left wound on the supply reel 1. Thus, the induced voltage is inversely proportional to the tape volume on the reel. It is to be noted that, according to the present invention, the induced voltage is utilized to control the field current of the supply reel motor to thereby control the resisting torque thereof.

Referring next to FIG. 2, which schematically illustrates a preferred embodiment of the invention, reference numeral 20 indicates a constant current power supply source which feeds the armature winding of supply reel motor 16, at winding terminal 18, with a current of a predetermined magnitude. The remaining winding terminal 19 is grounded. The output shaft 17 of the reel motor 16 is directly connected with the rotating shaft 2, on which the supply reel 1 is fixedly mounted. As will readily be noted, the motor shaft 17 may alternatively be indirectly connected with the reel shaft 2, if desired.

Referring again to FIG. 2, reference numerals 23 and 24 indicate the terminals of the field winding of the reel motor 16, and reference numeral 25 indicates a terminal of a constant voltage power supply source. As shown, one terminal 24 of the field winding is connected to a constant current amplifier 22. The voltage applied to the terminal 18 of the armature winding is also fed to one of the input terminals of a differential amplifier 21, which is fed at the other input terminal with a bias corresponding to the voltage drop due to the resistance of the armature circuit. Thus, the differential amplifier 21 produces an output which corresponds to the induced voltage arising across the armature winding when the motor is turned in the reverse direction. The output of differential amplifier 21 is fed to the constant-current amplifier 22 to control the current directed through the field winding.

Figure 3:
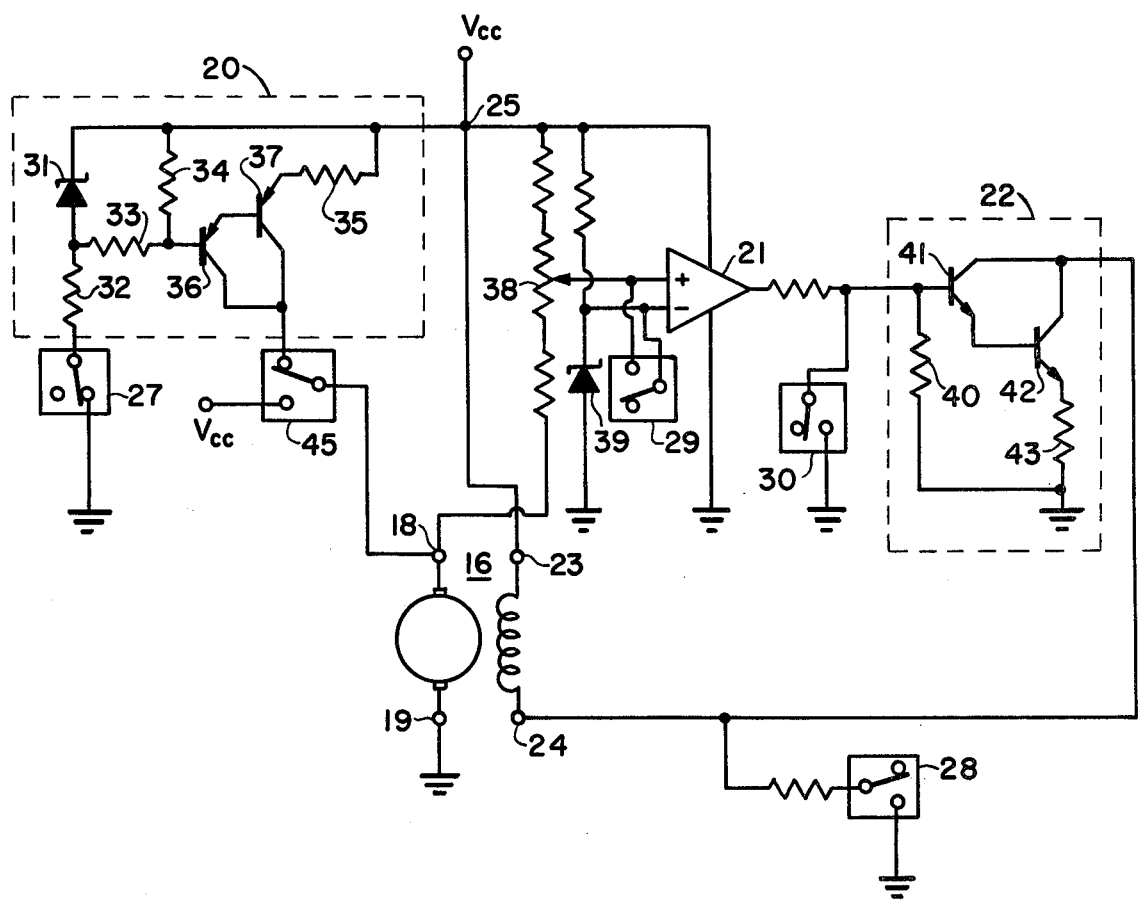
FIG. 3 is a circuit diagram of the essential elements of the embodiment shown in FIG. 2.

Reference will next be had to FIG. 3, which illustrates the circuit arrangement of the embodiment shown in FIG. 2 in which switches 27–30 and 45 are shown in the proper position for the recording or reproducing mode of the system. As illustrated, the constant-current source 20 is comprised of a zener diode 31, resistors 32–35, and transistors 36 and 37. The constant-current source is connected to the terminal 18 of supply reel motor 16 to thereby feed a current of a constant value to the armature winding thereof. The voltage at the armature winding terminal 18 is directed through a potentiometer 38 to the noninverting input terminal of differential amplifier 21. Applied to the inverting input terminal of the amplifier 21 is a voltage formed at the zener diode 39 which corresponds to the voltage drop due to the armature circuit resistance. The output of the differential amplifier 21 is applied to the input terminal of the constant-current amplifier 22, which is comprised of resistors 40 and 43 and transistors 41 and 42. The collectors of transistors 41 and 42 are connected to the supply terminal 25 of a constant voltage $V_{CC}$ through the field winding 44 of supply reel motor 16.

The output voltage of the differential amplifier 21, for which the voltage drop due to the armature circuit resistance is taken as a reference voltage, as described above, is reduced as the speed of rotation of the reel motor 16 increases. As a result, the current flowing through the field winding 44 is reduced under the effect of the constant-current amplifier 22. That is, as the speed of rotation of motor 16 increases or decreases, the current flowing through the field winding 44, and hence the output torque of motor 16 decreases or increases. It will be understood that in this manner the holdback tension in the magnetic tape can be held substantially at a constant level.

The value of the holdback tension can be adjusted by adjustment of the potentiometer 38. In one practical example, where the holdback tension was set at 150 grams for the mean tape volume on the supply reel, the holdback tension was held substantially fixed at a constant level, varying only within a limited range between a maximum value of approximately 180 grams for the minimum tape volume left on the supply reel and a minimum value of approximately 130 grams at the start of tape transport. Further, such limited variation in holdback tension can be readily reduced or elimianted, for example, by increasing the gain of the feedback loop of the system, as is well known in the art of automatic control.

It will be apparent from the foregoing description that, according to the present invention, there is provided a tension control system which can be formed from an extremely simplified electronic circuit including a shunt motor serving as a supply reel motor, not necessitating any separate mechanism for detection of the tape tension or for torque control. As will readily be appreciated, the tension control system of the present invention is highly stable in operation against mechanical shock and other external disturbances, extremely simples and concise in structure and inexpensive, as compared with any conventional form of tension control.

Although a specific embodiment of this invention has been shown and described, it will be understood that various modifications may be made without departing from the spirit of this invention.

What is claimed is:

1. A tape tension control system for tape recording and/or reproducing apparatus comprising a supply reel with a mass of tape wound thereon, a take-up reel arranged to wind up said tape as passed thereto from said supply reel, and a transducer provided on a tape path between said supply and take-up reels for recording and/or reproducing signals on said tape, said control system comprising:

a shunt motor coupled to said supply reel for driving said supply reel during a rewinding period for said tape wound on said take-up reel, said shunt motor having a field winding and an armature winding; a current source for producing a constant current through said armature winding of said shunt motor;

means for detecting an electromotive force induced in said armature winding, said detecting means including means for producing a voltage corresponding to the voltage drop due to said armature winding, and means responsive to said electromotive force for controlling the current through said field winding of said shunt motor, wherein said detecting means includes a differential amplifier having an inverting input, a non-inverting input and an output, the voltage developed across said armature winding being applied to said non-inverting input, and a zener diode, having a breadkdown voltage corresponding to the voltage drop due to said armature winding resistance being connected to said inverting input.

2. A tape tension control system in accordance with claim 1, wherein said output voltage of said differential amplifier is applied to a constant current amplifier adopted to apply current to said field winding, said output voltage being proportional to the voltage induced across said armature winding when said shunt motor is operating in a recording/reproducing period.

* * * * *